(12) United States Patent
Cottrell et al.

(10) Patent No.: US 12,059,116 B2
(45) Date of Patent: Aug. 13, 2024

(54) BYPASS VALVE

(71) Applicant: SHARKNINJA OPERATING LLC, Needham, MA (US)

(72) Inventors: Lee M. Cottrell, Edenbridge (GB); Oliver G. Holmes, London (GB)

(73) Assignee: SharkNinja Operating LLC, Needham, MA (US)

( * ) Notice: Subject to any disclaimer, the term of this patent is extended or adjusted under 35 U.S.C. 154(b) by 20 days.

(21) Appl. No.: 17/692,921

(22) Filed: Mar. 11, 2022

(65) Prior Publication Data

US 2022/0287521 A1    Sep. 15, 2022

Related U.S. Application Data

(60) Provisional application No. 63/159,691, filed on Mar. 11, 2021.

(51) Int. Cl.
| | |
|---|---|
| *A47L 9/02* | (2006.01) |
| *A47L 9/24* | (2006.01) |
| *B01D 46/12* | (2022.01) |
| *B01D 46/42* | (2006.01) |
| *B01D 46/44* | (2006.01) |

(52) U.S. Cl.
CPC ............ *A47L 9/02* (2013.01); *B01D 46/12* (2013.01); *B01D 46/4272* (2013.01); *B01D 46/44* (2013.01); *A47L 9/242* (2013.01)

(58) Field of Classification Search
CPC . A47L 9/02; A47L 9/242; A47L 9/244; A47L 5/00
USPC ........................................................ 15/300.1
See application file for complete search history.

(56) References Cited

U.S. PATENT DOCUMENTS

| | | | |
|---|---|---|---|
| 7,367,081 B2 | 5/2008 | O'Neal | |
| 7,979,955 B2 | 7/2011 | Lenkiewicz et al. | |
| 8,146,200 B2 | 4/2012 | Krebs et al. | |
| 8,887,347 B2 | 11/2014 | Louis et al. | |
| 2004/0060144 A1 | 4/2004 | Bowden et al. | |
| 2011/0016654 A1* | 1/2011 | Chudleigh | F16L 11/115 15/300.1 |

(Continued)

OTHER PUBLICATIONS

PCT Search Report and Written Opinion mailed Jun. 28, 2022, received in corresponding PCT Application No. PCT/US22/19981, 8 pages.

*Primary Examiner* — Abbie E Quann
(74) *Attorney, Agent, or Firm* — Grossman Tucker Perreault & Pfleger, PLLC (57) ABSTRACT

A bypass valve may include a body defining a dirty air passageway, a nozzle coupling port configured to fluidly couple the dirty air passageway to a nozzle of the surface cleaning device, a wand coupling port configured to fluidly couple the dirty air passageway to a wand of the surface cleaning device, a suction coupling port configured to fluidly couple the dirty air passageway with a suction motor of the surface cleaning device, a wand receptacle configured to removably couple to the wand, and a valve bypass arrangement configured to selectively redirect air flowing through the body such that a majority of the air flowing through the body transitions between flowing through one of the wand coupling port and the nozzle coupling port. The valve bypass arrangement redirects the air in response to the wand being coupled to or decoupled from the wand receptacle.

17 Claims, 6 Drawing Sheets

(56) References Cited

U.S. PATENT DOCUMENTS

| | | |
|---|---|---|
| 2011/0265881 A1 | 11/2011 | Morgan et al. |
| 2014/0259520 A1* | 9/2014 | Sutrina ................. A47L 9/0693 15/350 |
| 2017/0055790 A1 | 3/2017 | Dyson et al. |
| 2017/0347848 A1* | 12/2017 | Carter ....................... A47L 5/30 |
| 2019/0082925 A1* | 3/2019 | Conrad ............... A47L 11/4088 |

* cited by examiner

BYPASS VALVE

CROSS-REFERENCE TO RELATED APPLICATIONS

The present application claims the benefit of U.S. Provisional Application Ser. No. 63/159,691 filed on Mar. 11, 2021, entitled Shut Off Valve, which is fully incorporated herein by reference.

TECHNICAL FIELD

This specification generally relates to surface cleaning devices, and more particularly, to a bypass valve for use in a surface cleaning device that can at least partially reduce airflow to a nozzle when wand cleaning is desired by a user during operation.

BACKGROUND INFORMATION

The following is not an admission that anything discussed below is part of the prior art or part of the common general knowledge of a person skilled in the art.

Surface cleaning devices, such as upright vacuums, can include a nozzle with one or more brush rollers to dislodge dirt from floor surfaces and a suction motor for drawing dirt into a dust cup via a dirty air inlet of the nozzle. Such surface cleaning devices can also include a wand to allow for a user to utilize the wand for cleaning operations rather than the nozzle. The addition of such wands can increase the overall length of the dirty air passageway extending from the dirty air inlets of the nozzle/wand to the suction motor. This increased length of the dirty air passageway can increase load on a suction motor, and thus by extension, the amount of power necessary to maintain nominal suction power. For cordless surface cleaning devices, this can translate into a shorter use period prior to requiring recharging.

BRIEF DESCRIPTION OF THE DRAWINGS

These and other features advantages will be better understood by reading the following detailed description, taken together with the drawings wherein.

The drawings included herewith are for illustrating various examples of articles, methods, and apparatuses of the teaching of the present specification and are not intended to limit the scope of what is taught in any way.

DETAILED DESCRIPTION

The present disclosure is generally directed to a bypass valve. The bypass valve may be used with a surface cleaning device (e.g., a vacuum cleaner). For example, the bypass valve may include a first inlet (e.g., a nozzle coupling port), a second inlet (e.g., a wand coupling port), and an outlet (e.g., a suction coupling port). The first inlet and the second inlet are each configured to be fluidly coupled to the outlet of the bypass valve. The bypass valve is configured to transition between a bypass orientation and a nozzle orientation. When transitioning between the bypass orientation and the nozzle orientation, a primary fluid flow path (e.g., the flow path along which a majority, or all, of fluid flows) extending within the bypass valve is redirected. For example, when the bypass valve is in the bypass orientation, the primary fluid flow path may extend between the second inlet and the outlet. By way of further example, when the bypass valve is in the nozzle orientation, the primary fluid flow path may extend between the first inlet and the outlet.

When used in a vacuum cleaner having, for example, a nozzle for cleaning a floor and a wand for cleaning a surface above the floor, the bypass valve may selectively redirect the primary fluid flow path to one of the nozzle or wand based on an intended use of a user. Such a configuration may shorten an overall length of the fluid flow path (when compared to a vacuum cleaner without the bypass valve). The bypass valve can be configured to transition between the bypass orientation and the nozzle orientation based on the wand being mechanically coupled/decoupled (or docked/undocked) to the vacuum cleaner. For example, this transition can occur in response to the wand being coupled/decoupled with a wand receptacle of the bypass valve.

Figure 1A:
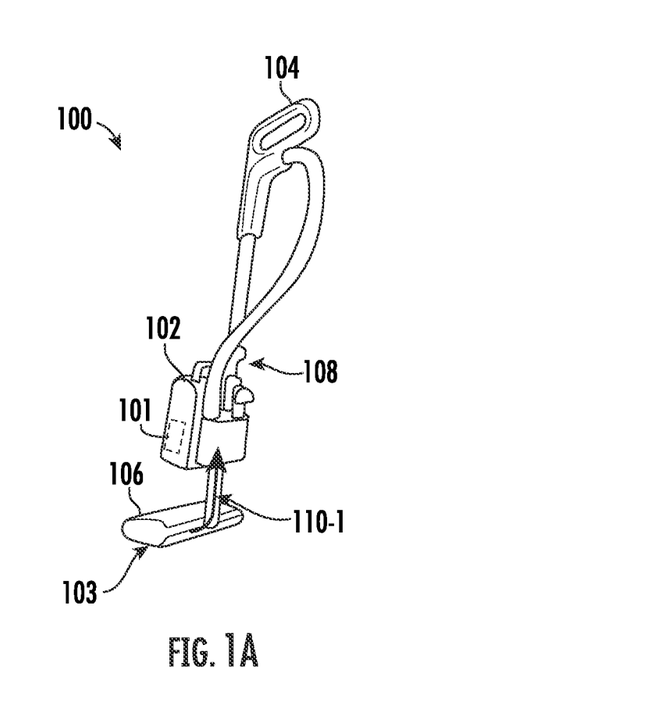
FIG. 1A shows an example surface cleaning device implementing a bypass valve, consistent with embodiments of the present disclosure.
Figure 1B:
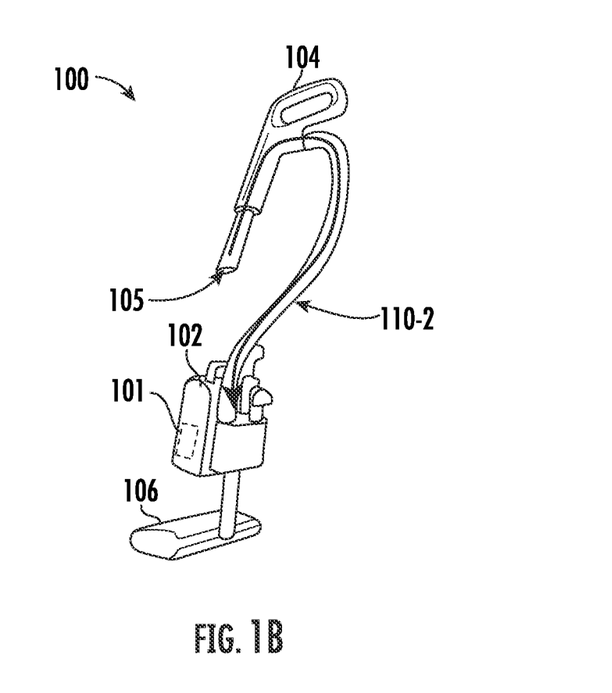
FIG. 1B shows another example of the surface cleaning device of FIG. 1A, consistent with embodiments of the present disclosure.

Referring to FIGS. 1A and 1B, an example surface cleaning device 100 consistent with aspects of the present disclosure is shown. The surface cleaning device 100 may be implemented as a cordless, e.g., battery operated, surface cleaning device. In some instances, the surface cleaning device 100 can be implemented as a cordless, up-right vacuum such as shown. However, other types of surface cleaning devices can implement a bypass valve consistent with the present disclosure with minor modification and are also within the scope of this disclosure.

The surface cleaning device 100 can include a housing 102. The housing 102 can include a power source such as one or more battery cells. The housing 102 can also include a suction motor 101 (shown schematically in hidden lines) for generating suction and a dust cup (not shown) for storing dirt collected during cleaning.

The surface cleaning device 100 may also include a wand 104 configured to be removably coupled (or docked) to a wand receptacle 108 provided by the housing 102 to allow a user to perform cleaning operations via the wand 104 rather than the nozzle 106. The wand receptacle 108 can be provided by a bypass valve consistent with the present disclosure, as is discussed further below. The wand 104 can be implemented as a crevice tool, which includes a relatively narrow profile to allow for the dirty air inlet 105 of the wand to be inserted into confined spaces, e.g., between couch cushions.

As shown in FIG. 1A, the nozzle 106 is fluidly coupled to the housing 102, and more specifically, the dust cup of the housing 102. The suction motor 101 is fluidly coupled to the dust cup and nozzle 106 such that air is drawn into the dust cup via the nozzle 106 by the suction motor 101. In this example, the nozzle 106 includes a dirty air inlet 103 fluidly coupled to the housing 102 by way of a first air passageway 110-1 to draw dirty air into the housing 102 during cleaning. The first air passageway 110-1 may also be referred to herein as a nozzle passageway.

The dirty air inlet 103 of the nozzle 106 can be fluidly coupled to the suction motor 101 by way of the first air passageway 110-1 based on the wand 104 being coupled/docked into the wand receptacle 108. In this example, and as discussed further below, the housing 102 can include a bypass valve configured to, in response to the wand 104 being coupled to the wand receptacle 108, cause the dirty air inlet 103 of the nozzle to fluidly couple to the suction motor 101 by way of the first air passageway 110-1.

On the other hand, and as shown in the example of FIG. 1B, the wand 104 can be decoupled from the housing 102 of the surface cleaning device 100. In this example, the bypass valve is configured to fluidly decouple the dirty air inlet 103 of the nozzle 106 from the suction motor 101 by way of disconnecting or otherwise substantially restricting airflow via the first air passageway 110-1, e.g., preventing at least 80% of airflow or preventing 100% of airflow.

The wand 104 can include a dirty air inlet 105 at a distal end that fluidly couples to the suction motor 101 by way of a second air passageway 110-2. The second air passageway 110-2 may also be referred to herein as a wand passageway. The second air passageway 110-2 may be configured to be fluidly coupled to the suction motor 101 when the wand 104 is decoupled from the wand receptacle 108 of the housing 102. The second air passageway 110-2 can be configured to be fluidly coupled to the suction motor 101 when the wand 104 is decoupled from the wand receptacle 108 uses a bypass valve consistent with the present disclosure, examples of which are discussed in detail below.

Figure 2A:
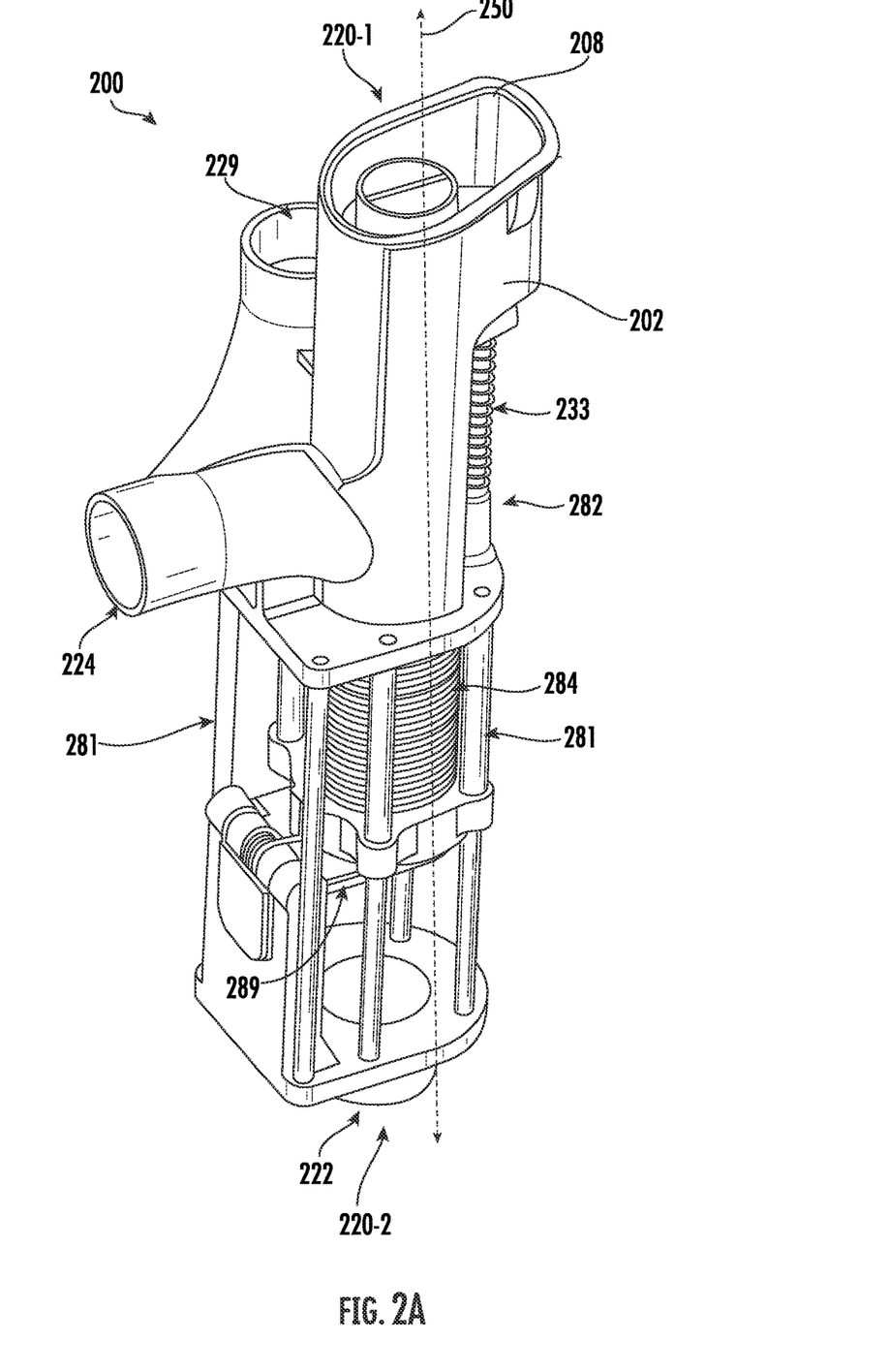
FIG. 2A shows an example bypass valve consistent with aspects of the present disclosure, consistent with embodiments of the present disclosure.
Figure 2B:
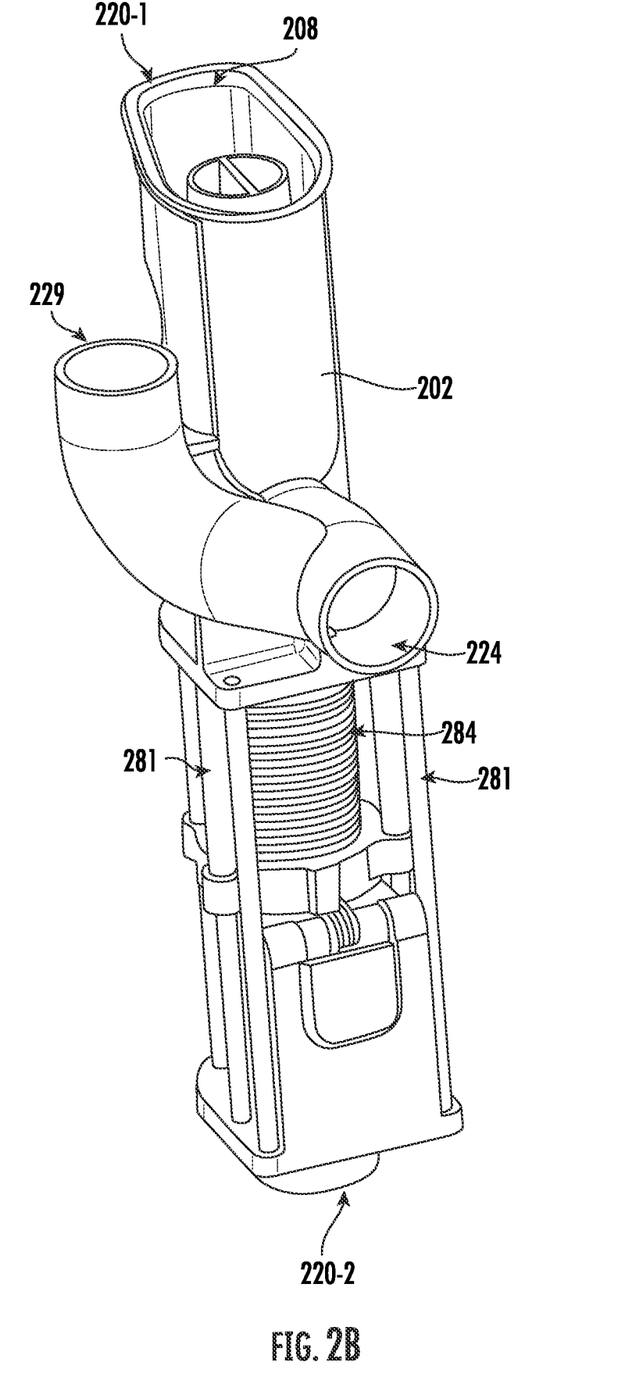
FIG. 2B shows another example of the bypass valve of FIG. 2A, consistent with embodiments of the present disclosure.
Figure 2C:
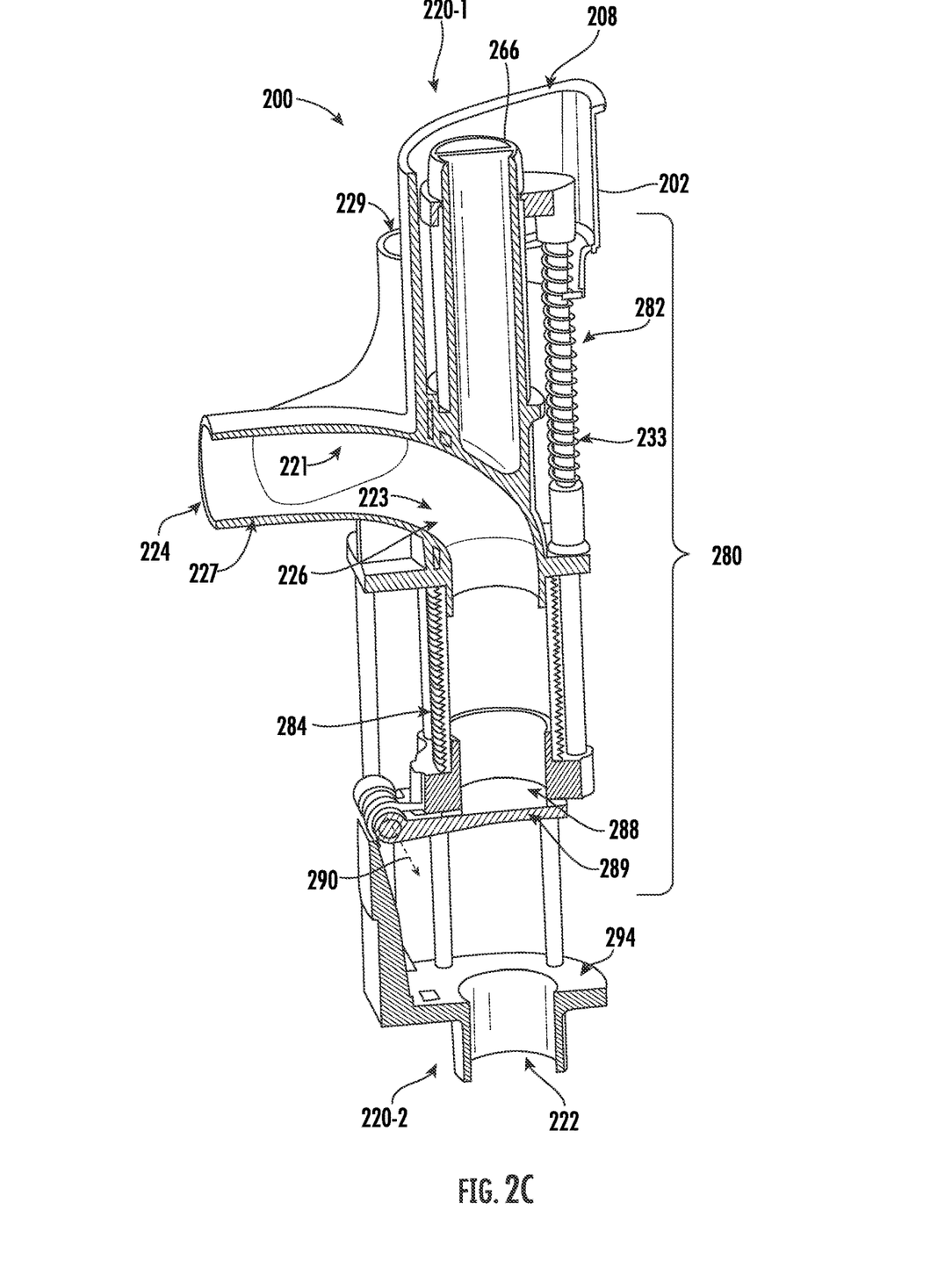
FIG. 2C shows another example of the bypass valve of FIG. 2A, consistent with embodiments of the present disclosure.

Referring to FIGS. 2A-2C, an example bypass valve 200 is shown consistent with aspects of the present disclosure. As shown, the bypass valve 200 includes a body 202. The body 202 is can be formed from a material such as acrylonitrile butadiene styrene (ABS), although other types of materials are within the scope of this disclosure.

The body 202 of the bypass valve 200 can have an elongated profile such as shown in FIG. 2A. In this example, the body 202 extends from a first end 220-1 to a second end 220-1 along longitudinal axis 250. As shown more clearly in the cross-sectional view of FIG. 2C, the body 202 can include a nozzle coupling port 222, a suction coupling port 224, and a wand coupling port 229. As shown, a wand passageway 221 fluidly couples the wand coupling port 229 with the suction coupling port 224 and a nozzle passageway 223 fluidly couples the nozzle coupling port 222 with the suction coupling port 224. In some instances, and as shown, the wand passageway 221 and the nozzle passageway 223 may converge and merge together to form a common passageway 227 that extends from the wand passageway 221 and the nozzle passageway 223 to the suction coupling port 224.

The body 202 may define a dirty air passageway 226 that extends between the first and second ends 220-1, 220-2 of the body 202. The dirty air passageway 226 can fluidly couple to the suction coupling port 224 and the wand coupling port 229. The nozzle coupling port 222 can be configured to switchably fluidly couple to the dirty air passageway 226 by way of a bypass arrangement 280, which is discussed in greater detail below.

As further shown, the nozzle coupling port 222 may be disposed at the second end 220-2 of the body 202. The nozzle coupling port 222 can be configured to fluidly couple to a nozzle, such as the nozzle 106 via the first air passageway 110-1 (See FIG. 1A).

The wand coupling port 229 can be disposed adjacent the first end 220-1 of the body 202. The wand coupling port 229 can be configured to fluidly couple to a wand, such as the wand 104 by way of the second air passageway 110-2. The wand coupling port 229 can be disposed adjacent the suction coupling port 224, such as via a substantially Y-shaped section as shown.

A wand receptacle 208 can be disposed adjacent the first end 220-1. The wand receptacle 208 can also be configured to receive and couple to a wand, such as wand 104 (See FIG. 1A). In some instances, the wand receptacle 208 can include a cavity with a shape that corresponds with the shape of the distal end of a wand. Accordingly, a wand can be at least partially inserted into the wand receptacle 208 for coupling purposes (See FIG. 1A). The wand receptacle 208 may further include wand plug 266, which may also be referred to herein as a plug. The wand plug 266 may be configured with an overall size that is substantially equal to the opening of the dirty air inlet of a wand, e.g., dirty air inlet 105 of wand 104 (See FIG. 1B). Thus, the wand plug 266 can be at least partially received into the dirty air inlet of a wand to block/prevent air flow therethrough. In one example, the wand plug is configured to block the dirty air inlet of a wand to restrict at least 80-90% of air flow into the dirty air inlet of the wand or restrict 100% of air flow into the dirty air inlet of the wand. Note, the dirty air inlet of the wand may also be blocked/sealed by other features/structures of a bypass valve consistent with the present disclosure and/or of a surface cleaning device implementing the same. For example, the wand airpath can be blocked by sealing the end of the wand (or handle) against a face of sealing material such as EPDM foam, e.g., within the wand receptacle 208, or sealed via insertion into a female receptacle which is an enclosed volume (e.g., a blind hole).

The wand plug 266 can also be disposed on actuator 282, which is discussed further below, and may be utilized to displace the same when a wand is coupled to the wand plug 266 via the wand receptacle 208.

The wand receptacle 208 can be configured to cause actuation of the bypass valve 200 to transition the bypass valve 200 between a nozzle orientation and bypass orientation, which is discussed in further detail below.

The bypass valve 200 may include a bypass arrangement 280 (or valve bypass arrangement). The bypass arrangement 280 may include a nozzle orientation for fluidly coupling a nozzle of a surface cleaning device to the dirty air passageway 226 and suction motor by way of nozzle coupling port 222, and a bypass orientation for fluidly decoupling the nozzle of the surface cleaning device from the suction motor by way of the dirty air passageway 326. The bypass arrangement 280 can be configured to transition between the nozzle orientation and the bypass orientation based on a wand being coupled/decoupled from the wand receptacle 208. The bypass arrangement 280 may cause a first amount of suction power to occur at the nozzle coupling port 222 in the bypass orientation and a second amount of suction power to occur at the nozzle coupling port 222 in the nozzle orientation, the first amount of suction power being less than the second amount of suction power. In other words, the bypass arrangement 280 is configured to redirect a primary fluid flow path extending within the body 202 of the bypass valve 200 (e.g., such that a majority, or all, of fluid flow transitions from one of the wand coupling port 229 or the nozzle coupling port 222 to the other of the wand coupling port 229 or the nozzle coupling port 222).

As shown, the bypass arrangement 280 includes an actuator 282 with a first end disposed within the wand receptacle and a second end coupled to an extendable conduit section 284. The actuator 282 may also be referred to herein as an actuator rod. The bypass arrangement 280 may further include a gate 289 pivotally coupled to the body 202 adjacent the second end 220-2 of the body 202.

The actuator 282 may extend substantially parallel with the longitudinal axis 250 (See FIG. 2A) of the body 202. The actuator 282 may also include a biasing mechanism 233 (e.g., a spring) which is configured to bias the extendable conduit section 284 in a direction that extends towards the wand receptacle 208. As shown, the biasing mechanism 233 extends concentrically with the actuator 282.

The bypass arrangement 280 may include at least one support 281. For example, the bypass arrangement can include a plurality of supports 281 (See FIG. 2B). The plurality of supports 281 can extend between the first and second ends 220-2-1, 220-2 of the body 202 along the longitudinal axis 250. The plurality of supports 281 can comprise a relatively rigid material such as metal to provide increased structural integrity for the body 202. In one example, the bypass valve 200 forms a portion of a support structure in an upright vacuum, and the plurality of supports 281 can be used to withstand the forces exerted by a user on to the wand coupled to the wand receptacle 208, which in the context of this example functions as the handle when using the nozzle for cleaning. The plurality of supports 281 can be also be utilized as guides/rails to allow the extendable conduit section 284 to move along an axis which extends substantially parallel with the longitudinal axis 250 of the body 202.

The extendable conduit section 284 may include a relatively flexible material such as Polyvinyl Chloride (PVC). The extendable conduit section 284 can include a first end fixed to an upper portion of the body 202 that defines the first end 220-1 and a second end that is slidably coupled to the plurality of supports 281. In addition, the second end of the extendable conduit section 284 couples to the actuator 282. Accordingly, the extendable conduit section 284 can be displaced by the actuator 282 to transition between a first position and a second position. When in the first position, the extendable conduit section 284 is retracted towards the wand receptacle 208, such as shown in FIG. 2C. In this position, the extendable conduit section 284 can be held in position via the spring bias force supplied by the biasing mechanism 233. Thus, the biasing mechanism 233 can bias the extendable conduit section 284 away the nozzle coupling port 222 such that the extendable conduit section 284 automatically transitions from the second position to the first position based on a wand being decoupled from the wand receptacle 208.

When in the first position, the gate 289 may abut/engage (e.g., directly) the second end of the extendable conduit section 284. When transitioning to the second position, the extendable conduit section 284 is extended (e.g., to fluidly couple with a nozzle). When in the first position, the extendable conduit section 284 has a first overall length and, when in the second position, the extendable conduit section 284 has a second overall length, wherein the first overall length is less than the second overall length.

As shown, the gate 289 can be pivotally coupled to the housing and can be configured to rotate about a first axis of rotation 290 (FIG. 2C). The first axis of rotation 290 can extend transverse (e.g., perpendicular) relative to the longitudinal axis 250 of the body 202. As further shown in FIG. 2C, the gate 289 can extend transverse (e.g., perpendicular) relative to the longitudinal axis 250 of the body 202 when the extendable conduit section 284 is in the first position (e.g., as shown in FIG. 2C). In this position, the gate 289 is can be configured to form an airtight seal (or substantially air tight seal) with an opening/aperture 288 at the second end of the extendable conduit section 284. In such a configuration, the gate 289 may prevent at least 80% of airflow through an interface formed between the gate 289 and the second end of the extendable conduit section 284 or prevent 100% of airflow.

The extendable conduit section 284 can be, for example, displaced by the actuator 282 based on a wand being received within the wand receptacle 208. This displacement can then cause the extendable conduit section 284 to extend to the second position. Movement to the second position can cause displacement of the gate 289 (e.g., rotational movement of the gate 289 about the first axis of rotation 290). When the extendable conduit section 284 is in the second position, the gate 289 can extend substantially parallel to the longitudinal axis of the body 202 when the extendable conduit section 284 is in the second position. The displacement of the gate 289 also decouples the above-mentioned air-tight seal with the second end of the extendable conduit section 284. The second end of the extendable conduit section 284 may engage/couple to the surface 294 which is disposed adjacent the second end 220-2 of the body 202. The second end of the extendable conduit section 284 may form an airtight seal with the second end of the body 202, and as a result, fluidly couples the nozzle coupling port 222 with the dirty air passageway 226 and suction motor of the surface cleaning device.

In operation, a user may then remove a wand from the wand receptacle 208 when wand cleaning is desired. The bypass arrangement 280 can then cause the extendable conduit section 284 to transition to the first position which causes the extendable conduit section 284 to fluidly decouple from the nozzle coupling port 222 such that no dirty air is received from the nozzle. The gate 289 then can rotate towards the extendable conduit section 284 to form an airtight, or at least substantially airtight seal, at the second end of the extendable conduit section 284. Such a configuration, reduces the overall length of the dirty air passageway 226, and thus by extension, reduces the amount of current draw by a suction motor of the surface cleaning device to maintain a nominal suction power. This reduced load on the suction motor may then extend operational lifespan for surface cleaning devices operating on battery power, for example.

In one example, a surface cleaning device implementing the bypass valve 200 can detect when the same is in the bypass orientation, e.g., when a user removes a wand from the wand receptacle 208 during a cleaning operation. For example, the surface cleaning device can utilize a contact switch (not shown) that is coupled to the extendable conduit section 284 that is actuated based on movement of the same. Alternatively, or in addition, the surface cleaning device may receive an electrical signal from a proximity sensor (not shown) such as a proximity switch that can detect the extendable conduit section 284 in the first position. In any such cases, the surface cleaning device may then detect the bypass valve 200 transitioning to the bypass orientation, and vice-versa, and adjust one or more operating modes. One such operating mode adjustment can include the surface cleaning device increasing suction power when the bypass valve 200 transitions to the bypass orientation, e.g., based on a user decoupling a wand from the wand receptacle 208. Accordingly, wand cleaning operations may then be enhanced by extra suction power relative to nozzle cleaning operations. Other adjustments to the operating mode include, but are not limited to, powering on/off a powered tool, activating/deactivating a light, powering on/off brush roll(s), and/or highlighting/illuminating a lift away release indicator.

Continuing the prior example, the surface cleaning device implementing the bypass valve 200 can also detect when the bypass valve 200 is in a nozzle orientation, e.g., when the wand is disposed in the wand receptacle 208 and coupled to the wand plug 266 such that no dirty air is received from the wand/handle. The user may then utilize the nozzle, e.g., nozzle 106 (See FIG. 1A) during a cleaning operation based on the extendable conduit section 284 fluidly coupling the nozzle of the surface cleaning device to the dirty air passageway 226 via the nozzle coupling port 222 to receive dirty air from the nozzle.

Figure 3A:
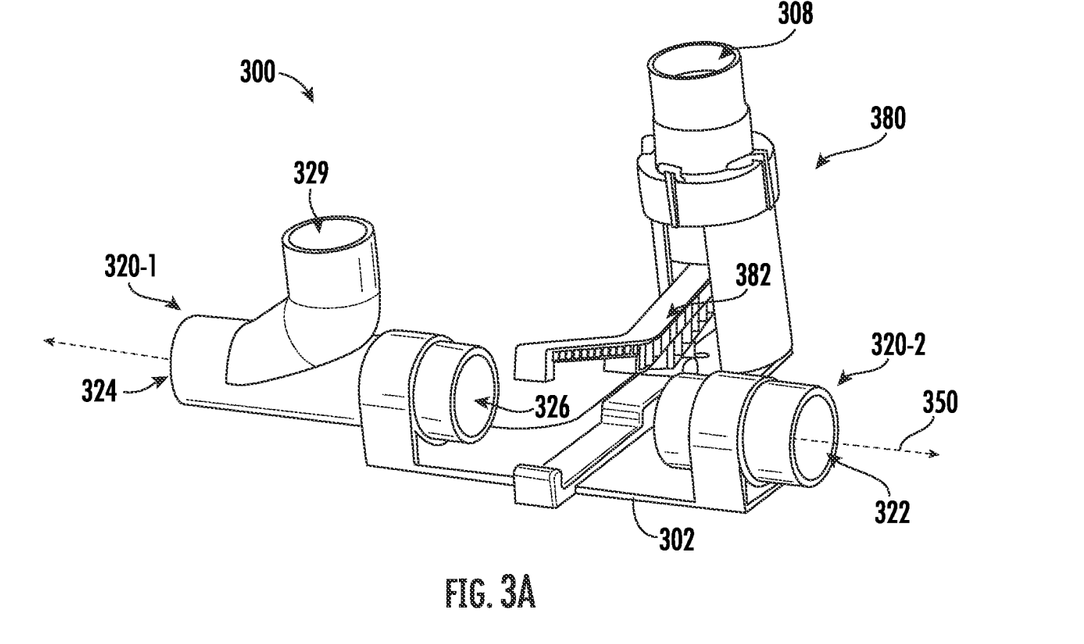
FIG. 3A shows an example bypass valve, consistent with embodiments of the present disclosure.
Figures 3B, 3C:
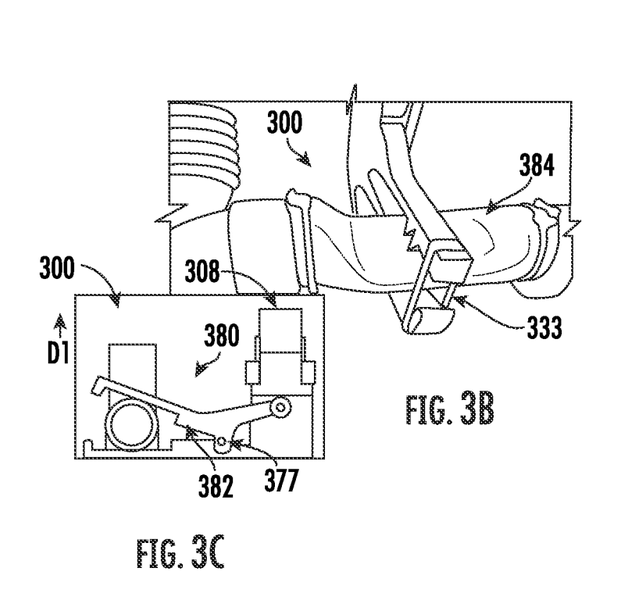
FIG. 3B shows another example of the bypass valve of FIG. 3A, consistent with embodiments of the present disclosure.
FIG. 3C shows another example of the bypass valve of FIG. 3A, consistent with embodiments of the present disclosure.

FIGS. 3A-3C shows another example bypass valve 300 consistent with aspects of the present disclosure. The example bypass valve 300 is suitable for use in a surface cleaning device, such as the surface cleaning device 100 discussed above with regard to FIGS. 1A-1B.

As shown, the example bypass valve 300 may include a body 302 that includes a first end 320-1 that defines a section for fluidly coupling with a suction motor of a surface cleaning device, and a second end 320-2 that defines a section for fluidly coupling with a nozzle of a surface cleaning device. The first and second ends 320-1, 320-2 can be disposed along a longitudinal axis 350 of the body 302 at opposite ends. The body 302 can define a dirty air passageway 326 that extends from the first end to the second end along the longitudinal axis 350. The body 302 may comprise a first material which is relatively rigid. Some such example materials for the first material include ABS.

The body 302 may further include a section that defines a wand receptacle 308 and a bypass arrangement 380 (or valve bypass arrangement). The wand receptacle 308 may include a wand plug (not shown), which can be configured substantially similar to the wand plug 266 of the example shown in FIG. 2C. The bypass arrangement 380 may include a nozzle orientation for fluidly coupling a nozzle of a surface cleaning device to the dirty air passageway 226 and suction motor, and a bypass orientation for fluidly decoupling the nozzle of the surface cleaning device from the suction motor. The bypass arrangement 380 can include an actuator 382 and deformable/flexible conduit section 384. The actuator 382 can be actuated to transition the bypass valve 300 between the nozzle orientation and the bypass orientation based on a wand being coupled/decoupled into the wand receptacle 308, as is discussed in further detail below.

The first end 320-1 may define a suction coupling port 324 for fluidly coupling the dirty air passageway 326 with a suction motor of a surface cleaning device. The first end 320-1 may define a wand coupling port 329 for fluidly coupling the dirty air passageway 326 to a wand, such as the wand 104 (See FIG. 1A). The wand coupling port 329 may be disposed adjacent the suction coupling port 324.

The second end 320-2 may define a nozzle coupling port 322 for fluidly coupling the dirty air passageway 326 with a nozzle of a surface cleaning device.

As further shown in the example of FIGS. 3A-3C, the body 302 includes the deformable conduit section 384 extending between the first and second ends along the body 302. The deformable conduit section 384 may define at least a portion of the dirty air passageway 326. The deformable conduit section 384 may include a second material which is relatively flexible relative to the first material of the body 302. Some example materials for the second material may include silicone rubber or foam rubber.

The bypass arrangement 380 may include a nozzle orientation for fluidly coupling a nozzle of a surface cleaning device to the dirty air passageway 326, and more particularly suction from a suction motor of the surface cleaning device, and a bypass orientation for fluidly decoupling the nozzle of the surface cleaning device from the suction motor by way of the dirty air passageway 326.

The bypass arrangement 380 may include the actuator 382 extending along a direction that is transverse (e.g., perpendicular) relative to the longitudinal axis 350 of the body 302. The actuator 382 may include and/or define an arm, which may also be referred to herein as a clamping arm, which is aligned with a portion of the deformable conduit section 384 and configured to supply a clamping force to the deformable conduit section 384. The clamping arm of the actuator 382 may further include a closing mechanism 333 (e.g., a spring, an elastic material, a linear actuator, a motor, and/or any other mechanism configured to exert a closing force on the actuator 382), which is configured to supply a compressing force to the deformable conduit section 384 when a wand is decoupled from the wand receptacle 308. In this scenario, the closing mechanism 333 supplies the clamping force to restrict air flow through the deformable conduit section (e.g., at least 20%, at least 30% of air flow, or more), substantially restrict airflow (e.g., at least 80%, at least 90%, or at least 95% of air flow), or restrict 100% of air flow, depending on a desired configuration. In any event, this orientation may be referred to as the bypass orientation.

On the other hand, and as shown more clearly in FIGS. 3B and 3C, the actuator 382 can include a pivot section 377 which is configured to cause the clamping arm to rotate and move along direction D1 when a wand is inserted into the wand receptacle 308. In this example, the wand may then displace the end of the actuator 382 disposed within the receptacle 308, and thus by extension, cause the clamping arm to rotate via pivot section 377. This rotation may reduce or minimize the clamping force supplied to the deformable conduit section 384. Inserting a wand in this manner may reduce the clamping force by at least 10%-20% or 50%-100%, to allow for air flow through the deformable conduit section 384 and for the nozzle of the surface cleaning device to fluidly couple with the suction motor. In any event, this orientation may be referred to as the nozzle orientation.

In operation, a user may then decouple a wand from the wand receptacle 308, and in response, the bypass arrangement 380 can introduce the clamping force to the deformable conduit section 384 and partially and/or completely restrict air flow therethrough (e.g., 100% restriction of air flow), as discussed above. This can result in the dirty air passageway 326 being reduced in length, which can therefore reduce the amount of power utilized by a suction motor of the surface cleaning device to maintain nominal suction. The surface cleaning device implementing the bypass valve 300 may also increase power when the wand is decoupled from the wand receptacle 308 to provide enhanced suction during the wand cleaning processes, as discussed above. In any such cases, the surface cleaning device can reduce the length of the dirty air passageway 326 by fluidly decoupling the nozzle when wand cleaning is desired by a user.

Figure 4:
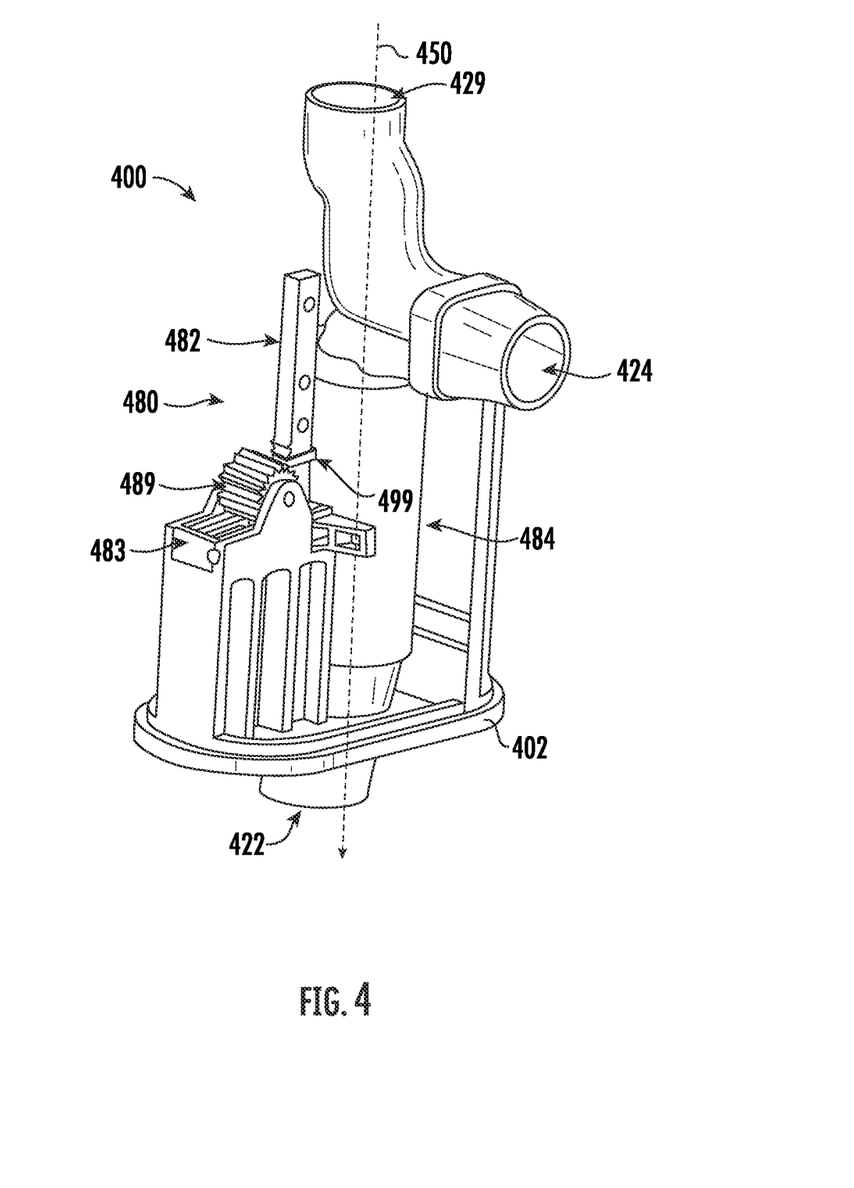
FIG. 4 shows an example bypass valve, consistent with embodiments of the present disclosure.

FIG. 4 shows another example bypass valve 400 consistent with aspects of the present disclosure. The bypass valve 400 may be configured substantially similar to that of the bypass valve 300 of FIGS. 3A-3C, the features and description of which is equally applicable to the bypass valve 400 and will not be repeated for brevity.

However, as shown in FIG. 4, the bypass valve 400 includes a bypass arrangement 480 (or valve bypass arrangement) that includes a rack and pinion configuration. In particular, the bypass arrangement 480 includes an actuator 482 that extends substantially parallel with the longitudinal axis 450 of the body 402. The actuator 482 may define a first arm that is configured to travel along a first axis that is substantially parallel with the longitudinal axis 450 of the body. The first arm of the actuator 482 can be configured to move in response to movement of a second arm 483 of the bypass arrangement 480. For example, a transfer mechanism 489 can be configured to transfer rotational movement between the first arm of the actuator 482 and the second arm 483. The first and second arms can be configured to include notches that engage teeth of the transfer mechanism 489. In this example, the transfer mechanism 489 is implemented as a gear that defines a plurality of such teeth.

In operation, the first arm of the actuator 482 may be configured to be displaced based on a biasing mechanism 499 which is configured to bias the first arm of the actuator 482 in a direction along a first axis which extends away from the body 402 (and second arm 483) along the longitudinal axis 450 to engage and cause rotation of the transfer mechanism 489. This rotation of the transfer mechanism 489 may cause the second arm 483 to be displaced towards the deformable conduit section 484 along a second axis, with the second axis being transverse (e.g., perpendicular) relative to the first axis along which the first arm extends. This second arm 483 then supplies a compressing force to the deformable conduit section to at least partially restrict air flow therethrough, as discussed above in prior examples. In this example, the wand coupling port 429 may remain fluidly coupled to the suction motor via the suction coupling port 424 to provide nominal suction at the dirty air inlet of a wand, such as dirty air inlet 105 of wand 104 (See FIG. 1B).

On the other hand, the actuator 482 may be displaced along a direction which is opposite the direction of the bias force supplied by the biasing mechanism 499. This can occur based on, for example, a wand being coupled into a wand receptacle (not shown). This displacement of the actuator 482 may then result in the second arm of the actuator 282 being drawn/pulled away from the deformable conduit section 484 based on the resulting rotation of the transfer mechanism 489. Thus, in this scenario the compressing force supplied to the deformable conduit section 484 may then be at least partially reduced to allow air flow therethrough, and thus by extension, for the bypass valve 400 to fluidly couple a nozzle of a surface cleaning device to a suction motor by way of nozzle coupling port 422 and suction coupling port 424.

An example of a bypass valve for use in a surface cleaning device, consistent with the present disclosure, may include a body defining a dirty air passageway, a nozzle coupling port configured to fluidly couple the dirty air passageway to a nozzle of the surface cleaning device, a wand coupling port configured to fluidly couple the dirty air passageway to a wand of the surface cleaning device, a suction coupling port configured to fluidly couple the dirty air passageway with a suction motor of the surface cleaning device, a wand receptacle configured to removably couple to the wand, and a valve bypass arrangement configured to selectively redirect air flowing through the body such that a majority of the air flowing through the body transitions between flowing through one of the wand coupling port and the nozzle coupling port. The valve bypass arrangement redirects the air in response to the wand being coupled to or decoupled from the wand receptacle.

In some instances, the body may include acrylonitrile butadiene styrene. In some instances, the body extends from a first end to a second end along a longitudinal axis and the wand receptacle may be disposed adjacent the first end of the body. In some instances, the valve bypass arrangement may include an actuator coupled to an extendable conduit section that is fluidly coupled to the dirty air passageway. In some instances, the extendable conduit section may be configured to transition between a first position in which the nozzle coupling port is fluidly decoupled from the dirty air passageway and a second position in which the nozzle coupling port is fluidly coupled to the dirty air passageway. In some instances, the extendable conduit section may include Polyvinyl Chloride (PVC). In some instances, the actuator may be configured to transition the extendable conduit section between the first position and the second position. In some instances, the valve bypass arrangement may further include at least one support that extends between the nozzle coupling port and the wand receptacle. In some instances, the at least one support may extend substantially parallel with the longitudinal axis of the body. In some instances, the extendable conduit section may be coupled to the at least one support and may be configured to slidably move along the at least one support when transitioning between the first position and the second position. In some instances, the valve bypass arrangement may further include a gate rotatably coupled to the body. In some instances, the gate may be configured to abut the second end of the extendable conduit section when the extendable conduit section is in the first position to at least partially prevent air from entering the dirty air passageway by way of the extendable conduit section. In some instances, the extendable conduit section may be configured to displace and cause rotational movement of the gate when the extendable conduit section is transitioned from the first position to the second position. In some instances, the gate may be biased towards the extendable conduit section. In some instances, the actuator may be biased such that the actuator moves the extendible conduit section towards the first position when the wand is decoupled coupled from the wand receptacle. In some instances, the valve bypass arrangement may include a deformable conduit section that defines at least a portion of the dirty air passageway. In some instances, the valve bypass arrangement may include an actuator to supply a clamping force to the deformable conduit section to reduce suction power at the nozzle coupling port. In some instances, the actuator may include a first arm configured to be displaced in response to movement of a transfer mechanism, the transfer mechanism moving in response to movement of a second arm, wherein movement of the first arm is transverse to movement of the second arm. In some instances, the second arm may be configured to travel towards the deformable conduit section to engage the deformable conduit section, causing the deformable conduit section to reduce airflow therethrough. In some instances, the second arm may be configured to introduce a clamping force to the deformable conduit section to fluidly decouple the nozzle coupling port from the dirty air passageway.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. It will be appreciated by a person skilled in the art that a surface cleaning apparatus may embody any one or more of the features contained herein and that the features may be used in any particular combination or sub-combination. Modifications and substitutions by one of ordinary skill in the art are considered to be within the scope of the present disclosure, which is not to be limited except by the claims.

What is claimed is:

1. A bypass valve for use in a surface cleaning device, the bypass valve comprising:
   a body defining a dirty air passageway;
   a nozzle coupling port configured to fluidly couple the dirty air passageway to a nozzle of the surface cleaning device;
   a wand coupling port configured to fluidly couple the dirty air passageway to a wand of the surface cleaning device;
   a suction coupling port configured to fluidly couple the dirty air passageway with a suction motor of the surface cleaning device;
   a wand receptacle configured to removably couple to the wand; and
   a valve bypass arrangement configured to selectively redirect air flowing through the body such that a majority of the air flowing through the body transitions between flowing through one of the wand coupling port and the nozzle coupling port;
   wherein the valve bypass arrangement redirects the air in response to the wand being coupled to or decoupled from the wand receptacle, wherein:
      the body extends from a first end to a second end along a longitudinal axis and the wand receptacle is disposed adjacent the first end of the body;
      the valve bypass arrangement includes an actuator coupled to an extendable conduit section that is fluidly coupled to the dirty air passageway;
      the extendable conduit section is configured to transition between a first position in which the nozzle coupling port is fluidly decoupled from the dirty air passageway and a second position in which the nozzle coupling port is fluidly coupled to the dirty air passageway; and
      the actuator is configured to transition the extendable conduit section between the first position and the second position.

2. The bypass valve of claim 1, wherein the body comprises acrylonitrile butadiene styrene.

3. The bypass valve of claim 1, wherein the extendable conduit section comprises Polyvinyl Chloride (PVC).

4. The bypass valve of claim 1, wherein the valve bypass arrangement further includes at least one support that extends between the nozzle coupling port and the wand receptacle.

5. The bypass valve of claim 4, wherein the at least one support extends substantially parallel with the longitudinal axis of the body.

6. The bypass valve of claim 4, wherein the extendable conduit section is coupled to the at least one support and is configured to slidably move along the at least one support when transitioning between the first position and the second position.

7. The bypass valve of claim 1, wherein the valve bypass arrangement further includes a gate rotatably coupled to the body.

8. The bypass valve of claim 7, wherein the gate is configured to abut the second end of the extendable conduit section when the extendable conduit section is in the first position to at least partially prevent air from entering the dirty air passageway by way of the extendable conduit section.

9. The bypass valve of claim 7, wherein the extendable conduit section is configured to displace and cause rotational movement of the gate when the extendable conduit section is transitioned from the first position to the second position.

10. The bypass valve of claim 7, wherein the gate is biased towards the extendable conduit section.

11. The bypass valve of claim 1, wherein the actuator is biased such that the actuator moves the extendible conduit section towards the first position when the wand is decoupled coupled from the wand receptacle.

12. A bypass valve for use in a surface cleaning device, the bypass valve comprising:
   a body defining a dirty air passageway;
   a nozzle coupling port configured to fluidly couple the dirty air passageway to a nozzle of the surface cleaning device;
   a wand coupling port configured to fluidly couple the dirty air passageway to a wand of the surface cleaning device;
   a suction coupling port configured to fluidly couple the dirty air passageway with a suction motor of the surface cleaning device;
   a wand receptacle configured to removably couple to the wand; and
   a valve bypass arrangement configured to selectively redirect air flowing through the body such that a majority of the air flowing through the body transitions between flowing through one of the wand coupling port and the nozzle coupling port;
   wherein the valve bypass arrangement redirects the air in response to the wand being coupled to or decoupled from the wand receptacle, wherein:
      the valve bypass arrangement includes a flexible conduit that is fluidly coupled to the dirty air passageway;
      the flexible conduit is configured to transition between a retracted position in which the nozzle coupling port is fluidly decoupled from the dirty air passageway and an extended position in which the nozzle coupling port is fluidly coupled to the dirty air passageway;
      the flexible conduit transitions from the retracted position to the extended position in response to the wand receptacle receiving the wand; and
      the flexible conduit transitions from the extended position to the retracted position in response to the wand being removed from the wand receptacle.

13. The bypass valve of claim 12, wherein the flexible conduit is configured to displace and cause rotational movement of a gate when the flexible conduit is transitioned from the retracted position to the extended position.

14. The bypass valve of claim 12, wherein the flexible conduit is biased towards the retracted position.

15. A bypass valve for use in a surface cleaning device, the bypass valve comprising:

a suction coupling port configured to fluidly couple with a suction motor of the surface cleaning device;

a nozzle coupling port configured to fluidly couple to a nozzle of the surface cleaning device;

a wand coupling port configured to fluidly couple to a wand of the surface cleaning device;

a wand receptacle configured to removably couple to the wand; and a valve bypass arrangement configured to selectively fluidly couple the suction coupling port to one of the nozzle coupling port or the wand coupling port based on a presence or an absence of the wand within the wand receptacle, the valve bypass arrangement including:

a flexible conduit that is configured to transition between a retracted position and an extended position, when in the extended position, the flexible conduit fluidly couples the suction coupling port to the nozzle coupling port, and when in the retracted position, the suction coupling port is fluidly decoupled from the nozzle coupling port, wherein:

the flexible conduit transitions from the retracted position to the extended position in response to the wand receptacle receiving the wand;

the flexible conduit transitions from the extended position to the retracted position in response to the wand being removed from the wand receptacle; and the flexible conduit has a first overall length in the retracted position and a second overall length in the extended position, the first overall length being less than the second overall length.

16. The bypass valve of claim 15, wherein the flexible conduit is configured to displace and cause rotational movement of a gate when the flexible conduit is transitioned from the retracted position to the extended position.

17. The bypass valve of claim 15, wherein the flexible conduit is biased towards the retracted position.

\* \* \* \* \*